Jan. 24, 1961 W. L. HUGHES 2,969,425
COLOR TELEVISION RECORDAL
Filed Jan. 12, 1959
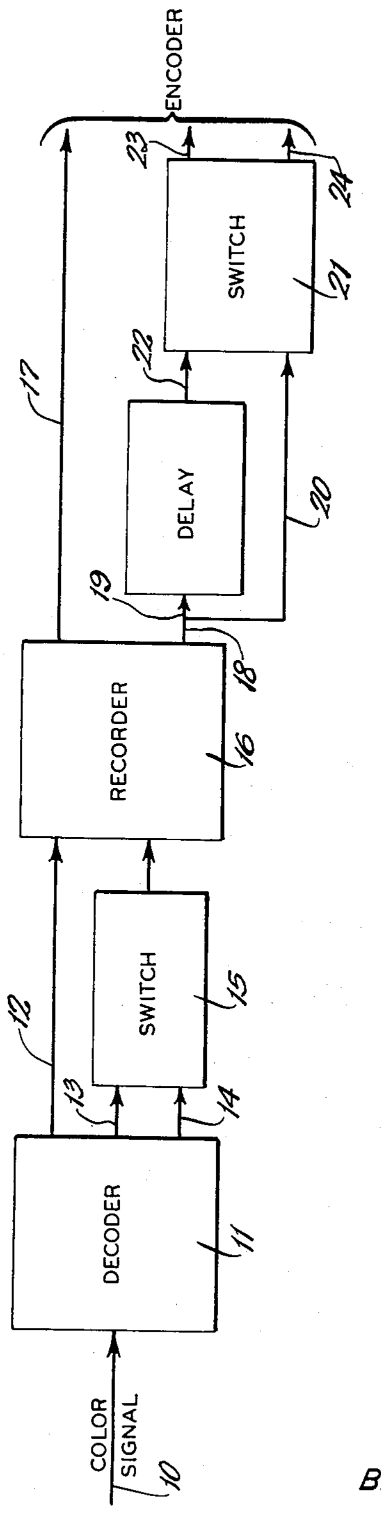
INVENTOR:
William L. Hughes,
BY Dawson, Tilton, Fallon & Lungmus,
ATTORNEYS.

2,969,425
Patented Jan. 24, 1961

2,969,425

COLOR TELEVISION RECORDAL

William L. Hughes, Ames, Iowa, assignor to Iowa State College Research Foundation, Inc., Ames, Iowa, a corporation of Iowa Filed Jan. 12, 1959, Ser. No. 786,112

3 Claims. (Cl. 178—5.4)

This invention relates to color television recordal and, more particularly, to a television system that employs chroma field storage and field switching to simplifying color television recording.

It is a principal object of this invention to provide a novel method and apparatus for color television recording. Another object is to provide a novel method and apparatus in which a color signal is decoded into three colorimetric components, with these three components being recorded in a two-channel fashion. Other objects and advantages of this invention can be seen as this specification proceeds.

The invention will be explained in conjunction with a schematic representation of a circuit for recording color signals which is attached as a drawing hereto.

In the illustration given, a color signal 10 is delivered to a decoder 11 through suitable coupling means. The decoder operates to decode or break the color signal into three colorimetric components which are transmitted from the decoder through lines 12, 13 and 14. For example, the line 12 may carry the Y component representing luminance, while chrominance components such as red and blue, are carried by lines 13 and 14. The chrominance components are delivered to a field switch 15 which operates at a field rate, i.e., one-sixtieth of a second, and throws away alternate color fields. For even fields, then, the field switch output is one color, say blue, and for odd fields, it is the other color, say red. These red-blue—red-blue sequences are then fed to a two-channel recording device 16, which may take the form of a film system, a magnetic tape recorder, or one of several other forms. Also fed to the recorder for recordation on a second channel is the Y signal in line 12.

Thus, it is seen that the switch operates to alternately select signals from two series of signals, and at a field rate. Only alternate R and B signals are recorded, if this be the chrominance information relied upon, while all of the Y or luminance signals are recorded.

On lead-out or reproduction, the two channels 17 and 18, 17 being Y signals, while 18 contains red and blue signals in field sequential relation, are duplicated, as at 19 and 20. The line 19 is connected to a delay circuit which may contain a barrier grid storage tube such as a Westinghouse WL–7225 Radechon barrier grid tube, while the line 20 is fed directly to a second field switch 21, the delay circuit being coupled to the switch 21 through a line 22. The switch 21, operating at a field rate, provides an output 23, which may be all red chrominance information, and an output 24, which may be all blue chrominance information. Greater details of this portion of the schematic circuit can be seen in my copending application, Serial No. 786,514, filed January 15, 1959. A suitable switch is described in my publication in the July 1956 issue of the SMPTE Journal.

The recording devices employed as recorder 16 may take the form of a two-image strip film as described in my copending patent applications, Serial No. 456,493, filed September 16, 1954; Serial No. 457,511, filed September 21, 1954; and Serial No. 475,534, filed December 15, 1954. Alternatively, a magnetic tape recorder such as the FM carrier type, may be used with two carriers in one recording head. One carrier in this instance would handle the luminance information (the Y information), and the other carrier would handle the chrominance information. A suitable recorder is currently marketed as an Ampex video tape recorder.

While, in the foregoing specification, I have set forth an embodiment of the invention in considerable detail for the purpose of explanation, it will be appreciated that those skilled in the art may vary the details thereof considerably without departing from the spirit and scope of the invention.

I claim:

1. In a method of telecasting, the steps of decoding a field sequence of color signals into three colorimetric components, each of said components being a series of signals with two of the components carrying primarily chrominance information, alternately selecting signals from the two chrominance series, recording the selected signals and the signal from the third series simultaneously to form two series from the series of three, duplicating the recorded series containing chrominance signals to provide two identical series of colorimetric signals, delaying one of the identical series a time equivalent to a field period in length, and alternately selecting signals from the two identical series.

2. The method of claim 1 in which the two series are recorded on tape.

3. The method of claim 1 in which the two series are recorded on film.

References Cited in the file of this patent

UNITED STATES PATENTS

| | | |
|---|---|---|
| 2,580,685 | Mathes | Jan. 1, 1952 |
| 2,587,006 | Smith | Feb. 26, 1952 |
| 2,786,887 | De France | Mar. 26, 1957 |